A. J. GOODRICH.
Cultivators.
No. 156,216. Patented Oct. 27, 1874.
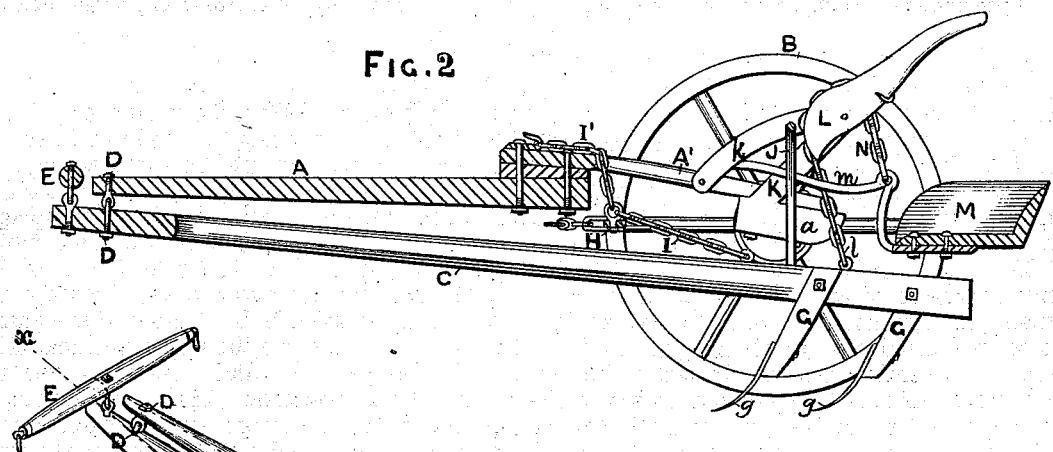
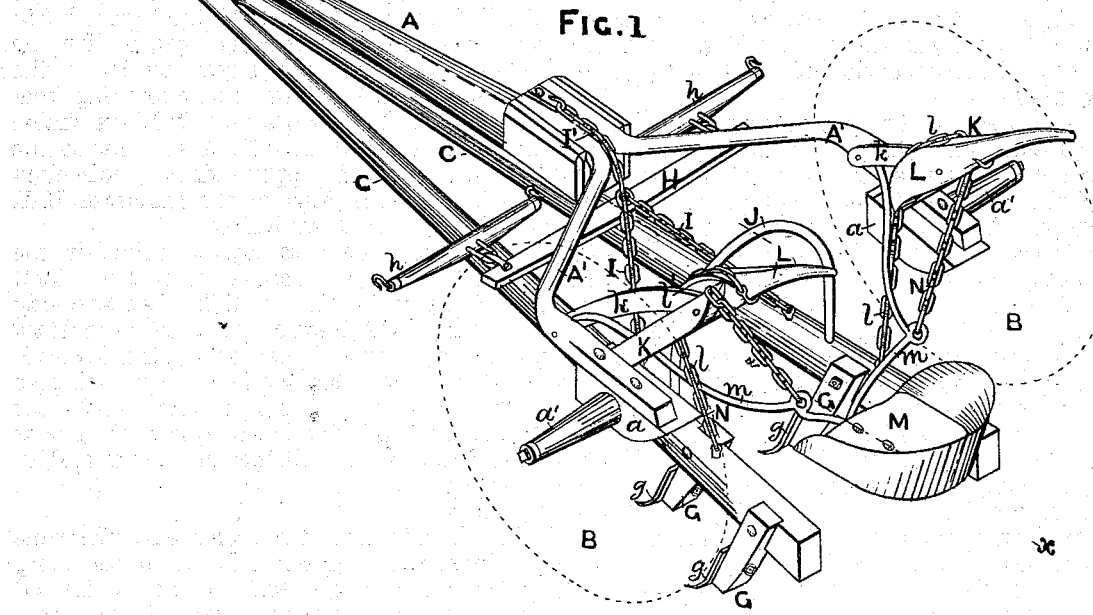

UNITED STATES PATENT OFFICE.

ARTHUR J. GOODRICH, OF ROCK GROVE, ILLINOIS.

IMPROVEMENT IN CULTIVATORS.

Specification forming part of Letters Patent No. 156,216, dated October 27, 1874; application filed February 7, 1874.

*To all whom it may concern:*

Be it known that I, ARTHUR J. GOODRICH, of Rock Grove, Stephenson county, State of Illinois, have invented certain Improvements in Cultivators, of which the following is a specification:

The nature of my invention relates to improvements in what are known as sulky-cultivators, or cultivators on which the driver rides to control the draft-animals and the machine; and the invention consists in a new and improved combination of devices whereby the arrangement of the draft and operation of the machine is rendered more easy and effective, all as hereinafter more fully set forth.

Figure 1 is a perspective view of a machine embodying my invention, and Fig. 2 is a longitudinal sectional view of Fig. 1, on the plane of the line $x$ $x$.

A represents the tongue, bifurcated at its rear end, the branches extending back and forming the two sides A' A' of the axle, each of the sides A' A' being attached at its rear end to a block, $a$, from which extend horizontally the wheel-spindles $a'$ $a'$. B B are the wheels, for supporting the axle, the driver's seat, and other devices. C C are the plow-beams, very lengthy, as shown in the drawings, extending forward in advance of the forward end of the tongue A and connected at their forward ends to each other. D D are interlocking eyebolts connecting the forward end of the tongue to the beams. E is the neck-yoke, pivoted in any ordinary way to the forward end of the beams C C. G G G G are the shanks, attached to the rear end of each beam C and carrying the shovels $g$ $g$ $g$ $g$. H is the double-tree, carrying on its ends the usual single-trees $h$ $h$, to which the draft-animals are attached. I I are chains, attached to the beams C C near the shanks G, and their forward ends secured to the center of the double-tree H, which rests below the tongue and on the beams C C. I' is a chain, suspending the double-tree H from the tongue A. J is an arched bar, connecting the rear ends of the beams C C to prevent their spreading, and may be taken hold of by the driver to aid in controlling the plows. K K are upright standards from the blocks $a$ $a$, from which braces $k$ $k$ extend to the sides A' A' of the axle. L L are eccentric levers, pivoted to the top of the standards K K, and $l$ $l$ are chains or cords, attached to the upper and rear sides of the levers L L, and, passing over the grooved and eccentric ends of said levers, as shown in the drawings, are extended downward and connected at the lower ends to the beams C C. $l'$ $l'$ are catches in the sides of the the L L, which engage with the braces $k$ $k$ to hold the levers in working position for the plows. M is the driver's seat, carried on the rear ends of spring-bars $m$ $m$, extending from the sides A' A' of the axle. N N are chains or cords, attached at their lower ends to the bars $m$ $m$, and their upper ends may be hooked to the sharpened tops of the standards K K to hold the seat M as desired.

It will be evident to any one skilled in the art that the driver may control the lateral movement of the plows with his feet, and may raise and lower them at pleasure or sustain them in an elevated position by the levers L L; and, further, that the long beams will give control of them, and the peculiar attachment of the draft will give improved results in that direction, both in utilizing the power and in relieving neck-draft.

I claim—

The combination of the tongue A and beams C C, with the double-tree H, the latter being suspended from the tongue and connected with the rear ends of the beams, in the manner and for the purpose specified.

ARTHUR JEROME GOODRICH.

Witnesses:
LEMUEL GOODRICH,
ORLANDO POTTER.